(No Model.)
A. W. JOHNSON.
FOUR WHEELED VEHICLE.
No. 437,600. Patented Sept. 30, 1890.
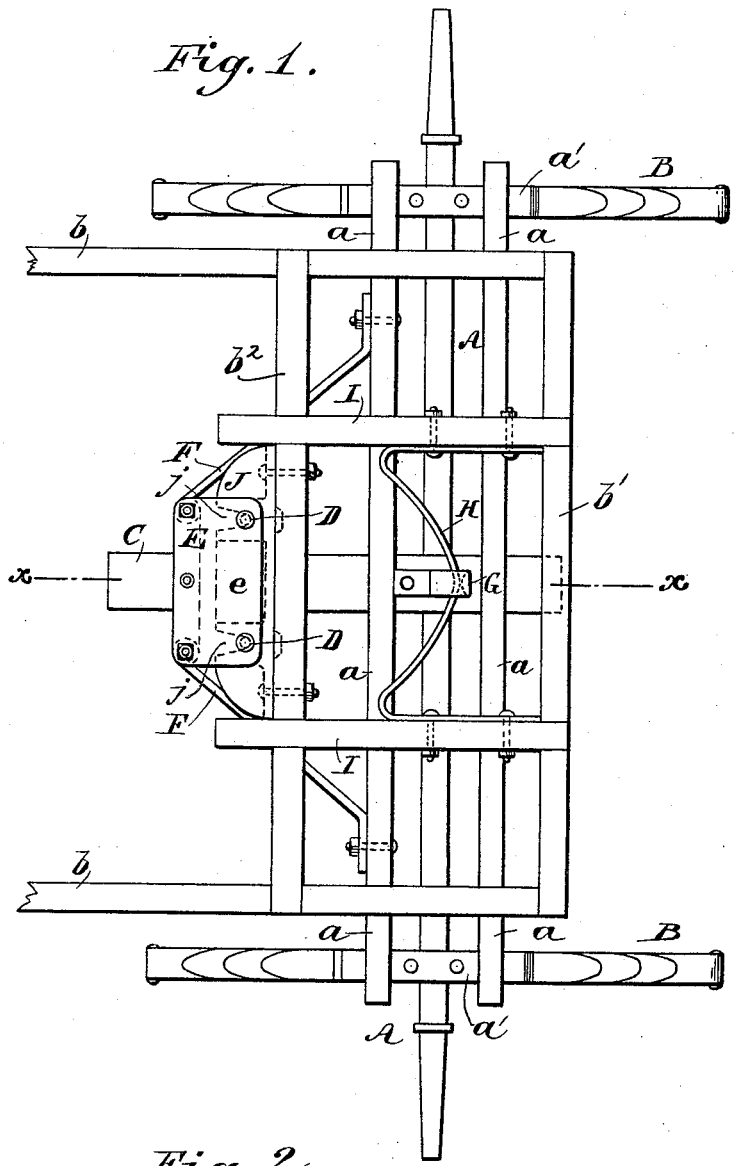
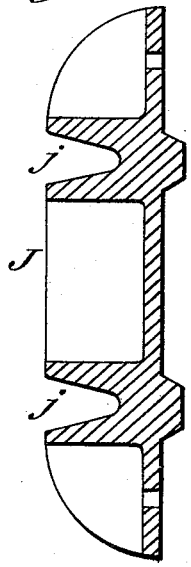
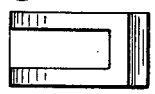
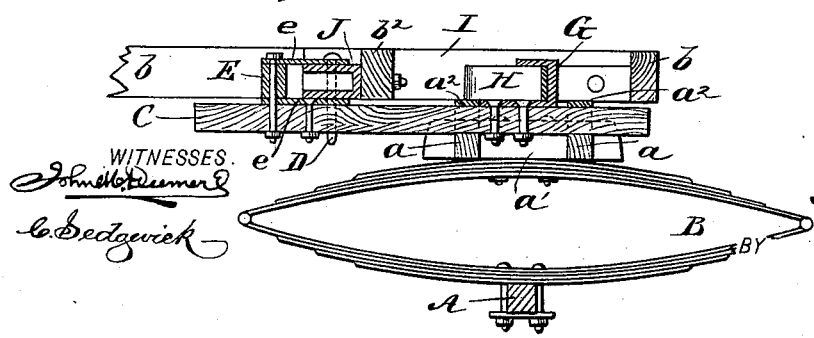
WITNESSES.
INVENTOR: A. W. Johnson
BY
ATTORNEYS

UNITED STATES PATENT OFFICE.

ALFRED W. JOHNSON, OF NEW BRUNSWICK, NEW JERSEY.

FOUR-WHEELED VEHICLE.

SPECIFICATION forming part of Letters Patent No. 437,600, dated September 30, 1890.

Application filed May 28, 1890. Serial No. 353,421. (No model.)

*To all whom it may concern:*

Be it known that I, ALFRED W. JOHNSON, of New Brunswick, in the county of Middlesex and State of New Jersey, have invented a new and Improved Four-Wheeled Vehicle, of which the following is a full, clear, and exact description.

The object of my invention is to provide such means for attachment of the body to the running-gear of four-wheeled vehicles as that the side lurch and thrashing of the tongue or thills incident to king-bolt vehicles shall be to a large degree obviated, thus improving the vehicle in point of steadiness and making it easier of draft on rough or uneven highways; and to this end my invention consists, principally, in a horizontal rocker attached to the body, combined with what I term "queen-bolts" attached to the running-gear at each side of the center line of the vehicle, each bolt furnishing an off-center turning point or bearing for the vehicle.

The invention also consists of a double curved cross-piece attached to the body, each curve being struck from the opposite queen-bolt or bearing as the center, combined with a complemental retainer attached centrally to the running-gear and engaging with the curved cross-piece, but permitting it to have free side-to-side movement.

The invention also consists of the special construction of the rocker, and of the various other parts and their combinations, all as hereinafter described and claimed.

Reference is to be had to the accompanying drawings, forming a part of this specification, in which similar letters of reference indicate corresponding parts in all the figures.

Figure 1 is a plan view of the running-gear and the body-frame of a vehicle constructed in accordance with my invention. Fig. 2 is a sectional elevation of the same on line $xx$ of Fig. 1. Fig. 3 is an enlarged sectional plan view of the rocker, and Fig. 4 is an end elevation of the same.

The axle A and springs B may be of the usual or of any approved construction. On the springs is mounted a frame comprising, in this instance, the parallel bars $a\,a$ and end pieces or blocks $a'\,a'$, which form the lower half of the fifth-wheel. The bars $a$ may be faced with metal plates $a^2$ to prevent wear, and into these bars is mortised the short central reach C, which carries the queen-bolts or bearings D D, one each side of the center of the vehicle. In this instance these bolts are held by a hollow frame or box E; but other means for holding them may be devised within wide scope, and therefore I do not confine myself to the use of said box; but I prefer said box, and when used it is bolted firmly to the reach C and held by the side braces F F, as shown clearly in Fig. 1.

To the reach C, in front of the box E, is secured the retainer G, preferably in the form of a hook, to hold the double-curved crossplate H, bolted at its ends to the short parallel bars I I of the body-frame. These bars and the said double-curved plates rest upon the bars $a\,a$, and to all intents and purposes constitute the upper half of the fifth-wheel. The said body-frame comprises, in this instance, in addition to the said parallel bars I, the main side rails $b\,b$, end rail $b'$, and inner rail $b^2$. The rocker J is bolted in horizontal position to the said rail $b^2$ or to some other rigid part or frame-work of the body. This rocker is notched or otherwise constructed to form the two V-shaped bearings $j\,j$ to receive the queen-bolts D, and in this instance it is made of sufficient width to work always between the upper and lower cheek-pieces $e\,e$ of the box E, so that in addition to its function as a horizontal rocker it also acts in connection with the double-curved cross plate or bar H and retainer G to hold the body securely to the running-gear, the bar H preventing the body from forward movement, the queen-bolts D in the box E preventing rearward movement, but neither preventing free side movement in either direction on the pins or bearings D, as the dual centers. The opposite curves of the bar H are struck each from its opposite pin D as a center, so that there will be no disengagement of the retainer G from the double-curved plate, whether the running-gear be turned to the right or left.

By this arrangement the weight of the load resists the turning of the running-gear so that the side lurch of the running-gear and the thrashing of the tongue in passing over uneven pavements and roads and over obstructions is largely obviated. This is apparent, in that the resistance to one wheel, tending to turn the running-gear on one of the queen-bolts, is met by the long leverage of the opposite wheel, and the turning of the obstructed wheel must move the center of the horizontal rocker J forward, which results in moving the load forward, and the reaction or the resistance of the load to this movement of itself of course tends to force the obstructed wheel easily over the obstruction.

Having thus described my invention, what I claim as new, and desire to secure by Letters Patent, is—

1. In a four-wheeled vehicle, the combination, with the running-gear, of two fixed bolts equidistant from the center line of the vehicle, and a rocker forming two bearings to engage the said bolts and secured to the box or body frame-work, substantially as described.

2. The running-gear provided with a box having queen-bolts or bearings D, in combination with the rocker J, secured to the body and fitted in said box and formed with bearings to engage with the queen-bolts, substantially as described.

3. The queen-bolts D, box E, and retainer G, secured to the running-gear, in combination with the rocker J and double-curved cross-plate H, substantially as described.

4. The body provided with the double-curved cross-plate H, each curve struck from a different center, combined with a retainer G, secured to the running-gear and engaging with the cross-plate H, substantially as described.

5. The reach C, secured at the center of the running-gear and provided with the retainer G, and box E, having the queen-bolts D, in combination with the rocker J and double-curved cross-plate H, secured to the body, substantially as described.

6. The parallel bars $a$, secured to the springs, the intermediate bars I, secured to the body, and the reach C, in combination with the box E, queen-bolts D, double-curved plate H, and retainer G, substantially as described.

ALFRED W. JOHNSON.

Witnesses:
JACOB H. HOAGLAND,
WILLIAM H. MESERALE.